United States Patent
Johnson et al.

(10) Patent No.: US 10,957,188 B2
(45) Date of Patent: Mar. 23, 2021

(54) SYSTEMS AND METHODS FOR DETERMINING TRAFFIC FLOW USING OBSERVATIONS OF SURROUNDING VEHICLES

(71) Applicant: Toyota Motor Engineering & Manufacturing North America, Inc., Plano, TX (US)

(72) Inventors: Miles J. Johnson, Ann Arbor, MI (US); Christopher J. Smalley, Canton, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 161 days.

(21) Appl. No.: 16/204,622

(22) Filed: Nov. 29, 2018

(65) Prior Publication Data

US 2019/0311612 A1     Oct. 10, 2019

Related U.S. Application Data

(60) Provisional application No. 62/652,373, filed on Apr. 4, 2018.

(51) Int. Cl.
| | |
|---|---|
| *G08G 1/01* | (2006.01) |
| *G06K 9/00* | (2006.01) |
| *G08G 1/052* | (2006.01) |

(52) U.S. Cl.
CPC ....... *G08G 1/0133* (2013.01); *G06K 9/00825* (2013.01); *G08G 1/0112* (2013.01); *G08G 1/0116* (2013.01); *G08G 1/052* (2013.01); *G06K 2209/23* (2013.01)

(58) Field of Classification Search
CPC .... G08G 1/0133; G08G 1/0112; G08G 1/052; G06K 9/00825; G06K 2209/23
USPC .......................................................... 701/118
See application file for complete search history.

(56) References Cited

U.S. PATENT DOCUMENTS

| | | | |
|---|---|---|---|
| 7,706,964 B2 * | 4/2010 | Horvitz | G01C 21/3492 701/117 |
| 7,912,627 B2 | 3/2011 | Downs et al. | |
| 9,086,481 B1 | 6/2015 | Dowdall et al. | |
| 9,117,098 B2 | 8/2015 | Trombley et al. | |
| 9,747,505 B2 | 8/2017 | Chen et al. | |
| 9,953,535 B1 | 4/2018 | Canavor et al. | |
| 10,553,117 B1 * | 2/2020 | Johnson | G08G 1/166 |

(Continued)

FOREIGN PATENT DOCUMENTS

| | | |
|---|---|---|
| EP | 1591980 A1 | 11/2005 |
| JP | 2009217376 A | 9/2009 |

*Primary Examiner* — Peter D Nolan
*Assistant Examiner* — Wae L Louie
(74) *Attorney, Agent, or Firm* — Christopher G. Darrow; Darrow Mustafa PC

(57) ABSTRACT

System, methods, and other embodiments described herein relate to determining traffic flow along a roadway segment. In one embodiment, a method includes collecting, in an electronic data store from reporting vehicles that travel over the roadway segment, traffic data about at least surrounding vehicles of the reporting vehicles. The method includes analyzing the traffic data to identify a traffic flow for the respective lanes of the roadway segment. The method includes providing a signal identifying the traffic flow.

20 Claims, 7 Drawing Sheets

(56) References Cited

U.S. PATENT DOCUMENTS

| | | | |
|---|---|---|---|
| 2010/0280751 A1* | 11/2010 | Breed | G08G 1/161 |
| | | | 701/414 |
| 2011/0095908 A1 | 4/2011 | Nadeem et al. | |
| 2015/0269843 A1 | 9/2015 | Ichinokawa | |
| 2016/0042644 A1* | 2/2016 | Velusamy | G08G 1/0112 |
| | | | 340/435 |
| 2016/0171893 A1* | 6/2016 | Chen | G01S 15/931 |
| | | | 701/300 |
| 2016/0364983 A1 | 12/2016 | Downs et al. | |
| 2017/0364080 A1* | 12/2017 | Chintakindi | B60W 50/082 |
| 2018/0022348 A1* | 1/2018 | Chu | G08G 1/096725 |
| | | | 701/23 |
| 2019/0187723 A1* | 6/2019 | Tao | G01C 21/32 |
| 2019/0250639 A1* | 8/2019 | Xu | G08G 1/096827 |
| 2019/0311612 A1* | 10/2019 | Johnson | G08G 1/0116 |
| 2019/0311613 A1* | 10/2019 | Johnson | G08G 1/096775 |
| 2020/0135022 A1* | 4/2020 | Xu | G08G 1/0112 |

* cited by examiner

SYSTEMS AND METHODS FOR DETERMINING TRAFFIC FLOW USING OBSERVATIONS OF SURROUNDING VEHICLES

CROSS-REFERENCE TO RELATED APPLICATIONS

This application claims benefit of U.S. Provisional Application No. 62/652,373, filed on, Apr. 4, 2018, which is herein incorporated by reference in its entirety.

TECHNICAL FIELD

The subject matter described herein relates in general to systems for determining traffic flow on a segment of a road, and, more particularly, to using observations from vehicles traveling on the segment about surrounding vehicles to determine the traffic flow.

BACKGROUND

The rate of traffic flow on a segment of road is generally indicative of an extent of congestion and/or other conditions associated with the segment. In general, coarse data from, for example, mobile phones or stationary infrastructure systems can provide a rough determination of the traffic flow. However, this approach generally provides limited coverage and has an accuracy that is not always representative of the actual existing conditions. For example, when using tracking data from mobile phones moving through a segment of a road, the coarse GPS information may provide conflicting information when separate lanes of the road are moving at different rates (e.g., exit lane blocked while travel lanes are free flowing).

That is, because the GPS information has a limited precision (e.g., several meters), information from devices within separate lanes is generally indistinguishable, and thus traffic flows produced from such data are provided at a granularity of the overall roadway. Moreover, circumstances, where an access road or other road run parallel to a highway being monitored for traffic flow, may cause further difficulties within such systems when the information from both roads is mistakenly combined because of the coarse representation from the GPS data. static infrastructure-based systems encounter separate limitations such as high costs, limited sections of roadways that can be monitored, and so on. These examples illustrate how the existing approaches can lead to inaccurate or insufficient information about traffic flow along a roadway that ultimately results in extended travel times and other difficulties.

SUMMARY

Example systems and methods relate to a manner of assessing lane-level traffic flow. For example, to overcome the noted difficulties of inaccuracies and other limitations within traditional information for assessing traffic flow, the disclosed system leverages sensors within vehicles traveling on the road segments to acquire improved information for assessing the traffic flow. In one embodiment, vehicles traveling along the road that include sensors such as radar, cameras, GPS, and so on are employed for acquiring information to determine traffic flow. As provided for herein, the reporting vehicles collect information about not only a location of the reporting vehicles but also data about surrounding vehicles perceived by the reporting vehicles.

That is, in one approach, as a reporting vehicle travels along a roadway segment, the reporting vehicle is generally aware of a location on the roadway segment as identified by, for example, a GPS or other location determining sensor (e.g., LiDAR using feature-based localization). While this information can be reported individually, as previously indicated, such observations provide a narrow perspective about traffic flow because the individual observations relate to positions/movements of a single vehicle within a single lane. Thus, the reporting vehicle further leverages onboard systems to, for example, identify surrounding vehicles and observe speeds of the surrounding vehicles. Accordingly, the reporting vehicle multiplies the observing power of the single vehicle to include the many vehicles around the reporting vehicle. As such, the reporting vehicle is then capable of reporting traffic data about the reporting vehicle itself along with the surrounding vehicles in order to provide a fuller view of the traffic patterns on the roadway segment.

Consequently, the reporting vehicle communicates the traffic data about the vehicles to an aggregation point such as a cloud-computing system (e.g., traffic system). The noted system can then analyze the aggregated information to identify congestion levels embodied therein. From this accumulated congestion information, the traffic system, in one aspect, generates warnings and other traffic-related information to oncoming vehicles in order to inform the oncoming vehicles about current traffic conditions on the roadway. In this way, the disclosed system leverages observations from many different vehicles to generate more improved awareness about traffic flow from which various indicators can be derived to facilitate travel along the roadway segment.

In one embodiment, a traffic system for determining traffic flow along a roadway segment is disclosed. The traffic system includes one or more processors and a memory communicably coupled to the one or more processors. The memory stores an acquisition module including instructions that when executed by the one or more processors cause the one or more processors to collect, in an electronic data store from reporting vehicles that travel over the roadway segment, traffic data about at least surrounding vehicles of the reporting vehicles. The memory stores a flow module including instructions that when executed by the one or more processors cause the one or more processors to analyze the traffic data to identify a traffic flow for the respective lanes of the roadway segment. The flow module includes instructions to provide a signal identifying the traffic flow.

In one embodiment, a non-transitory computer-readable medium for determining traffic flow along a roadway segment and including instructions that when executed by one or more processors cause the one or more processors to perform one or more functions. The instructions include instructions to collect, in an electronic data store from reporting vehicles that travel over the roadway segment, traffic data about at least surrounding vehicles of the reporting vehicles. The instructions include instructions to analyze the traffic data to identify a traffic flow for the respective lanes of the roadway segment. The instructions include instructions to provide a signal identifying the traffic flow.

In one embodiment, a method for determining traffic flow along a roadway segment is disclosed. In one embodiment, a method includes collecting, in an electronic data store from reporting vehicles that travel over the roadway segment, traffic data about at least surrounding vehicles of the reporting vehicles. The method includes analyzing the traffic data to identify a traffic flow for the respective lanes of the roadway segment. The method includes providing a signal identifying the traffic flow.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
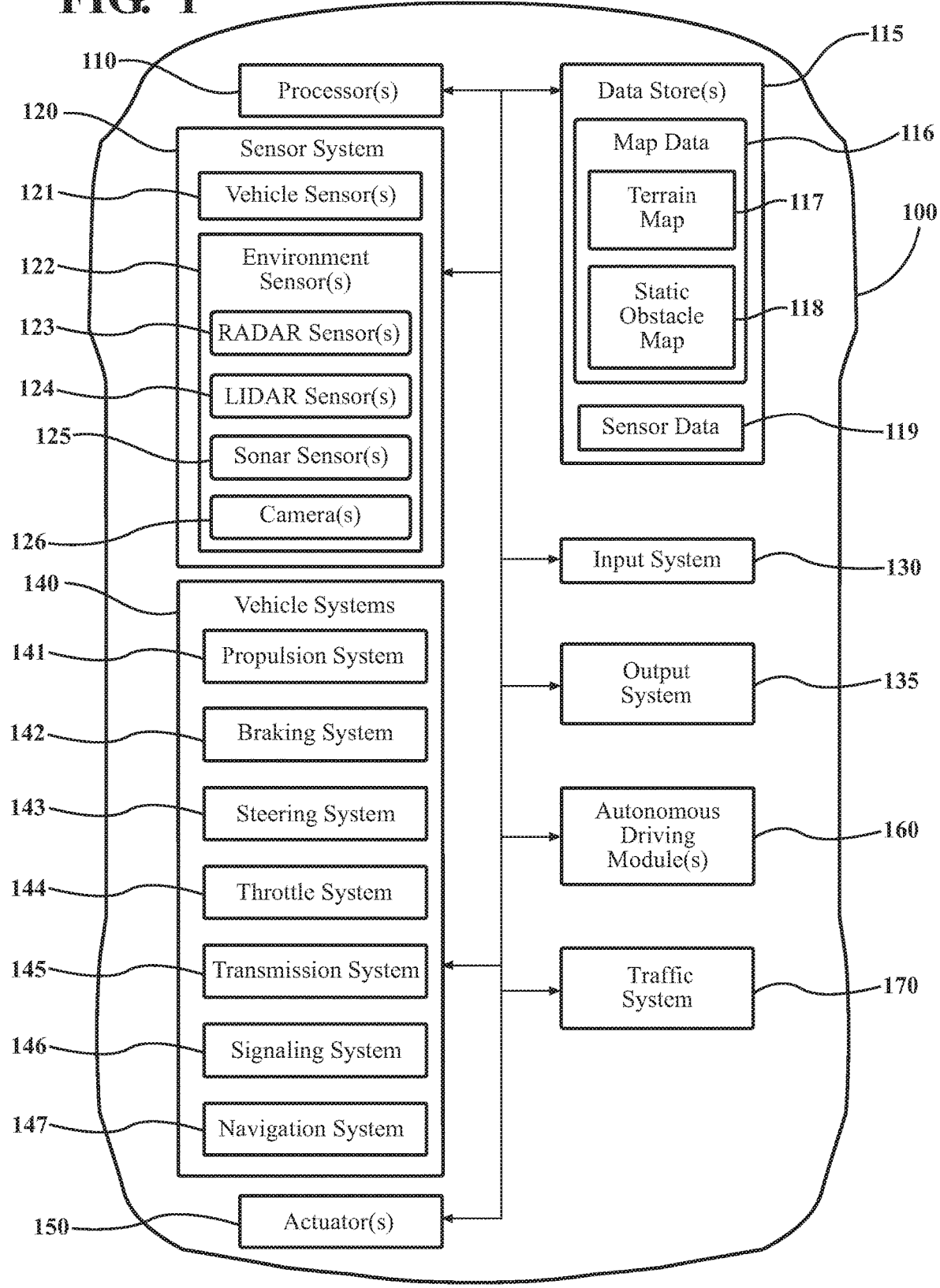
FIG. 1 illustrates one embodiment of a vehicle within which systems and methods disclosed herein may be implemented.

Systems, methods, and other embodiments associated with improving assessing lane-level traffic flow. Because solutions relying solely on GPS tracking, static infrastructure, and so on generally provide traffic information that is either imprecise (e.g., road level vs lane level) or incomplete (e.g., limited section of a road), navigation and other vehicle systems rely on the traffic information as generalized information about an area that may not be fully accurate. Thus, autonomous, semi-autonomous, and/or other systems that rely on precise knowledge of traffic for navigation and other functions may not use the generalized traffic information provided by the noted approaches.

However, in one embodiment, the disclosed system, for example, leverages improved roadway observations from a ubiquitous network of devices to provide improved traffic congestion information. For example, in one approach, a traffic system as disclosed herein leverages sensors within vehicles traveling on the road segments to assess the traffic flow. Consider that at least a portion of vehicles traveling along the road include sensors such as radar, cameras, GPS, and so on that may be employed for acquiring information from to support various advanced driving features and/or autonomous functions. Thus, the disclosed systems and methods, as provided for herein, leverages the information acquired by the reporting vehicles to generate improved traffic congestion information. That is, in one approach, the disclosed systems and methods acquire not only a location of reporting vehicles but also data about surrounding vehicles perceived by the reporting vehicles.

As a reporting vehicle travels along a roadway segment, the reporting vehicle is generally aware of a location on the roadway segment as identified by, for example, a GPS or other location determining sensor (e.g., LiDAR using feature-based localization). Moreover, in one or more aspects, the reporting vehicle perceives lanes and further determines within which lane the reporting vehicle is presently traveling. While this information (e.g., location and speed) can be reported individually, such observations provide a narrow perspective about traffic flow because the individual observations relate to positions/movements of a single vehicle within a single lane. Thus, the reporting vehicle further leverages onboard systems to, for example, identify surrounding vehicles and observe speeds of the surrounding vehicles.

That is, for example, the reporting vehicle uses the sensor data to identify surrounding vehicles, locations of the surrounding vehicles in particular lanes, and speeds of the surrounding vehicles. Accordingly, the reporting vehicle multiplies the observing power of the single vehicle to include the many surrounding vehicles around the reporting vehicle by gaining additional information about the other lanes and traffic in the other lanes overall through observations of the surrounding vehicles. As such, the reporting vehicle is then capable of reporting traffic data about the reporting vehicle itself along with traffic data about the surrounding vehicles in order to provide a more comprehensive view of the traffic patterns on the roadway segment.

Consequently, the reporting vehicle communicates the traffic data about the vehicles to an aggregation point such as a cloud-computing system (e.g., traffic system) while traveling along the roadway. The noted system can then analyze the aggregated information to identify congestion levels/traffic flows embodied therein. From this accumulated congestion information, the traffic system, in one aspect, communicates traffic-related information to oncoming vehicles and/or other traffic reporting systems in order to better inform interested parties about current traffic conditions on the roadway. In this way, the disclosed approach leverages observations from many different vehicles about surrounding vehicles to generate more precise indications about traffic flow.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus provides information that benefits the functionality discussed herein for deriving traffic data in relation to the vehicle 100. As a further note, this disclosure generally discusses the vehicle 100 as traveling on a roadway with surrounding vehicles, which are intended to be construed in a similar manner as the vehicle 100 itself. That is, the surrounding vehicles can include any vehicle that may be encountered on a roadway by the vehicle 100.

Additionally, the disclosure further discusses the vehicle 100 as traveling on a roadway that includes multiple lanes. The present approach may be applied to roadways of varying configurations (e.g., 2, 3, 4 or more lanes traveling in a single direction). In general, the approach provided herein is characterized by a reporting vehicle (e.g., vehicle 100) observing surrounding vehicles that are traveling in the same direction along a roadway. In some instances, the traffic system 170 may provide traffic data about lanes associated with observations of vehicles that are not moving along a roadway segment with the vehicle 100 (e.g., on parallel service roads, etc.); while, such configurations are generally understood to be within variations of the disclosed systems and methods such approaches are not detailed herein.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within a vehicle while further components of the system are implemented within a cloud-computing environment.

Some of the possible elements of the vehicle 100 are shown in FIG. 1 and will be described along with subsequent figures. However, a description of many of the elements in FIG. 1 will be provided after the discussion of FIGS. 2-7 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a traffic system 170 that is implemented to perform methods and other functions as disclosed herein relating to improving traffic data. As will be discussed in greater detail subsequently, the traffic system 170, in various embodiments, is implemented partially within the vehicle 100, and, for example, as a cloud-based service. For example, in one approach, functionality associated with at least one module of the traffic system 170 is implemented within the vehicle 100 while further functionality is implemented within a cloud-based computing system.

Figure 2:
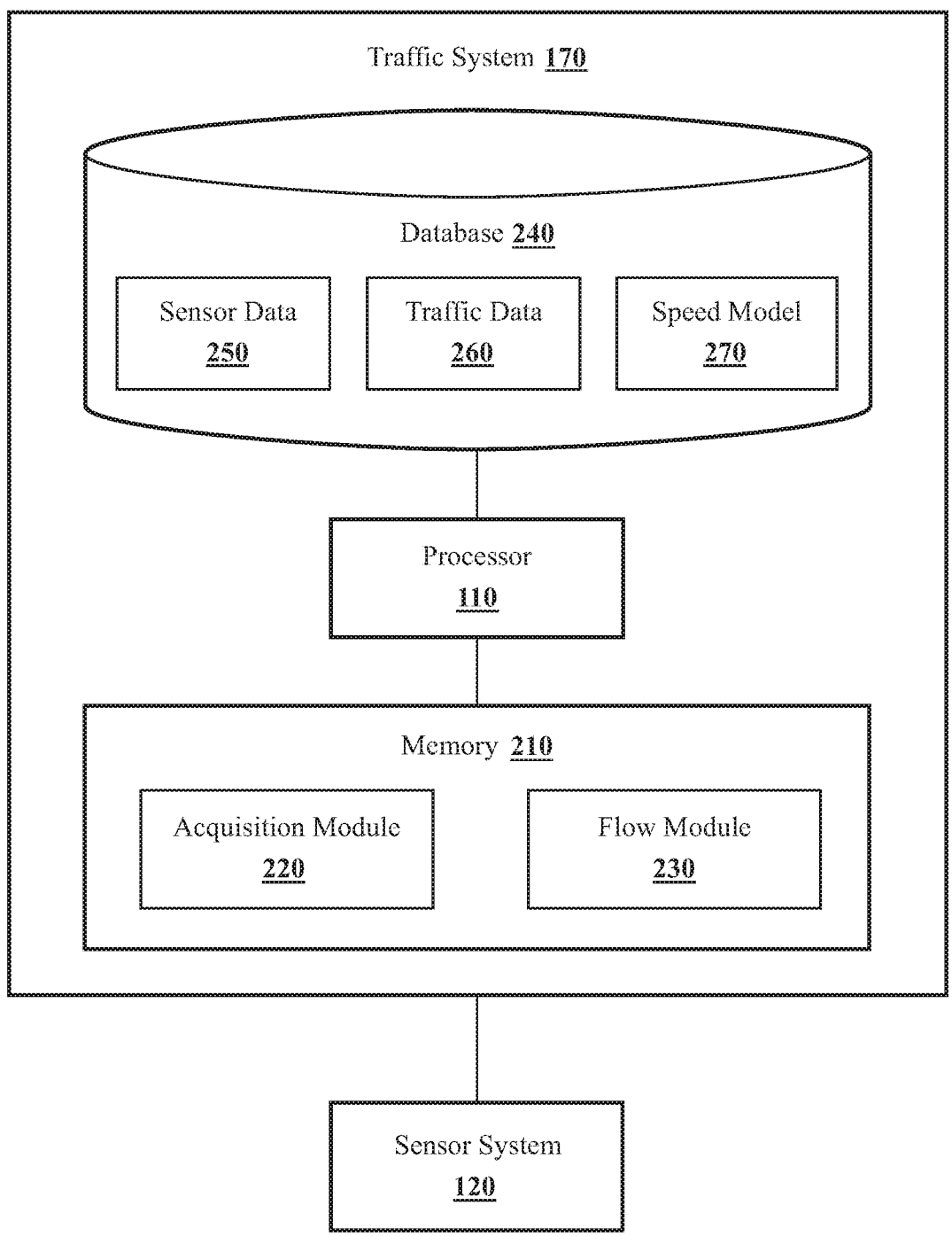
FIG. 2 illustrates one embodiment of a traffic system that is associated with using observations of surrounding vehicles to determine traffic flow over a roadway segment.

With reference to FIG. 2, one embodiment of the traffic system 170 of FIG. 1 is further illustrated. The traffic system 170 is shown as including a processor 110 from the vehicle 100 of FIG. 1. Accordingly, the processor 110 may be a part of the traffic system 170, the traffic system 170 may include a separate processor from the processor 110 of the vehicle 100, or the traffic system 170 may access the processor 110 through a data bus or another communication path. In one embodiment, the traffic system 170 includes a memory 210 that stores an acquisition module 220 and a flow module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Figure 3:
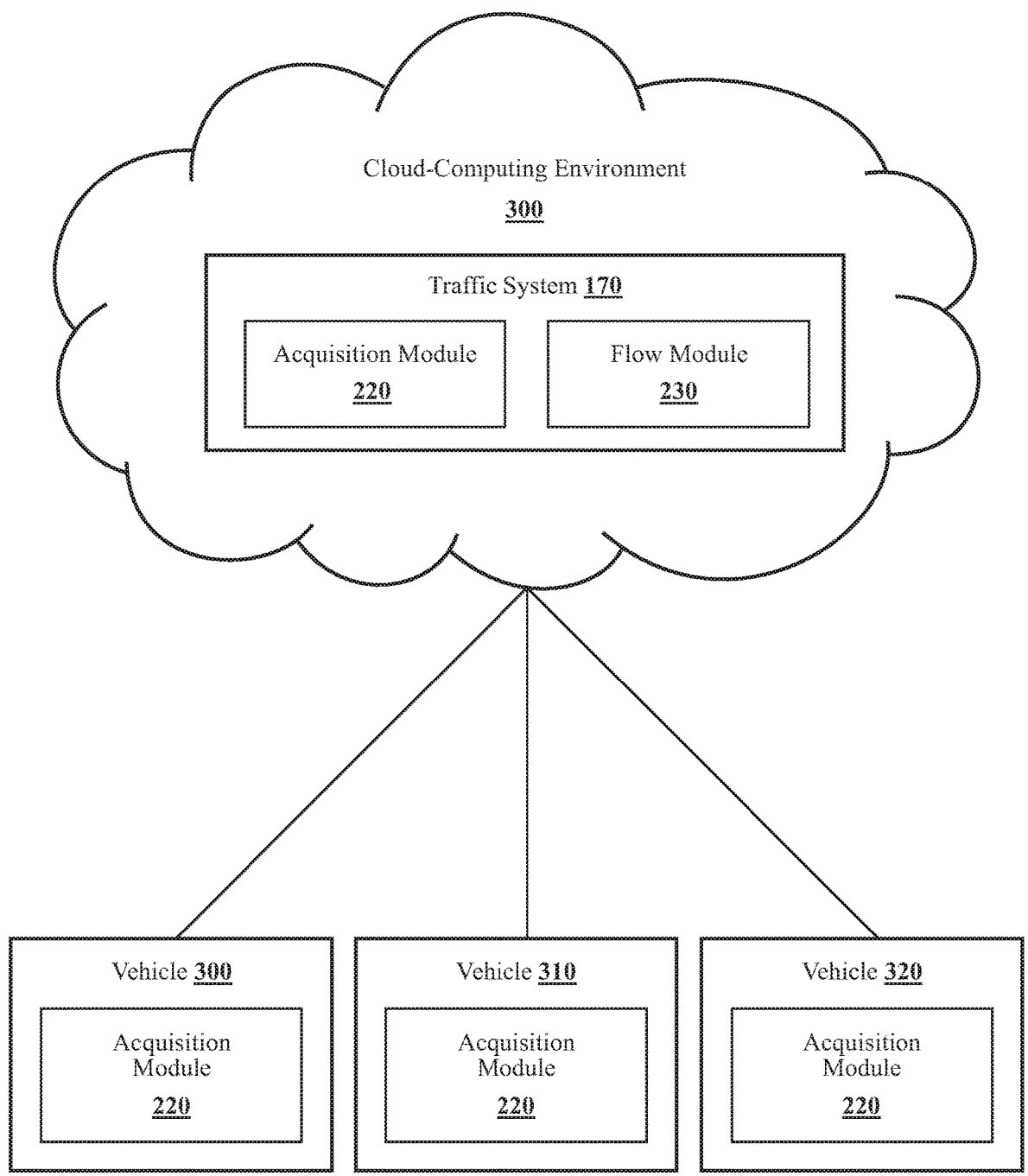
FIG. 3 illustrates one embodiment of the traffic system of FIG. 2 in a cloud-computing environment.

The traffic system 170 as illustrated in FIG. 2 is generally an abstracted form of the traffic system 170 as may be implemented between reporting vehicles such as the vehicle 100 and a cloud-computing environment. FIG. 3 illustrates one example of a cloud-computing environment 300 that may be implemented along with the traffic system 170. As illustrated in FIG. 3, the traffic system 170 is embodied in part within the cloud-computing environment 300 and also within the respective reporting vehicles 310, 320, and 330. That is, the vehicles 310, 320, and 330 each include the acquisition module 220 or at least a portion thereof while the cloud-computing environment 300 includes the acquisition module 220 and the flow module 230 or at least relevant portions thereof. Thus, the acquisition module 220 is generally implemented within both aspects of the system 170 in order to provide for handling of the electronic data that includes the observations.

Moreover, the vehicles 310, 320, and 330 generally represent reporting vehicles that are equipped with sensors to execute the observations of the surrounding vehicles. That is, the vehicles 310, 320, and 330 are, for example, vehicles similar to the vehicle 100. The noted vehicles may be autonomous, semi-autonomous, equipped with advanced driving assistance systems (ADAS), or another arrangement that generally includes sensors capable of perceiving other vehicles within a surrounding environment such that relative locations of the surrounding vehicles can be generated from the sensor data. Additionally, while three vehicles are illustrated, it should be appreciated that as a general matter the number of vehicles is not limited but instead includes any number of vehicles that are equipped in the noted manner and provide reports about the location and the surrounding vehicles.

With continued reference to FIG. 2, the acquisition module 220 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the acquisition module 220, in one embodiment, acquires sensor data 250 that includes at least camera images. In further arrangements, the acquisition module 220 acquires the sensor data 250 from further sensors of the sensor system 120 such as a radar 123, a LiDAR 124, and other sensors as may be suitable for identifying vehicles and locations of the vehicles.

Accordingly, the acquisition module 220, in one embodiment, controls the respective sensors to provide data inputs for various processes in the form of the sensor data 250. Additionally, while the acquisition module 220 is discussed as controlling the various sensors to provide the sensor data 250, in one or more embodiments, the acquisition module 220 can employ other techniques to acquire the sensor data 250 that are either active or passive. For example, the acquisition module 220 may passively sniff the sensor data 250 from a stream of electronic information provided by the various sensors to further components within the vehicle 100. Moreover, the acquisition module 220 can undertake various approaches to fuse data from multiple sensors when providing the sensor data 250 and/or from sensor data acquired over a wireless communication link (e.g., v2v) from one or more of the surrounding vehicles. Thus, the sensor data 250, in one embodiment, represents a combination of perceived data acquired from multiple sensors.

In addition to locations of surrounding vehicles, the sensor data 250 may also include, for example, information about lane markings, and so on. In one approach, the acquisition module 220 uses the observations of lane markings to, for example, identify separate lanes within the roadway and correlate the separate lanes with different surrounding vehicles. Thus, the traffic system 170 can correlate the further information observed about the surrounding vehicles, as will be discussed in greater detail subsequently, with particular lanes on the roadway.

Moreover, the acquisition module 220, in one embodiment, controls the sensors to acquire the sensor data 250 about an area that encompasses 360 degrees about the vehicle 100 in order to provide a comprehensive assessment of the surrounding environment. Of course, in alternative embodiments, the acquisition module 220 may acquire the sensor data 250 about a forward direction alone when, for example, the vehicle 100 is not equipped with further sensors to include additional regions about the vehicle and/or the additional regions are not scanned due to other reasons (e.g., unnecessary due to known current conditions).

Moreover, in one embodiment, the traffic system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes the sensor data 250 along with, for example, metadata that characterize various aspects of the sensor data 250. For example, the metadata can include location coordinates (e.g., longitude and latitude), relative map coordinates or tile identifiers, time/date stamps from when the separate sensor data 250 was generated, and so on. In one embodiment, the database 240 further includes traffic data 260 as generated by the acquisition module 220. Moreover, the database 240, in one approach, includes a speed model 270 that assesses the traffic data 260 to produce traffic flows on a per-lane basis for a roadway. Additionally, in embodiments where the database 240 is implemented as part of a cloud-computing environment, the traffic data 260 includes data aggregated from multiple separate reporting vehicles.

As a further explanation, the sensor data 250 can include 3D point cloud data, camera images and/or video from the camera 126, radar measurements, and so on. In further embodiments, the sensor data 250 includes information from further sensors (e.g., a GPS) that may be used to further confirm a location of the vehicle 100 beyond, for example, localization performed according to feature-based data.

The acquisition module 220, in one embodiment, is further configured to perform additional tasks beyond controlling the respective sensors to acquire and provide the sensor data 250. For example, the acquisition module 220 initially analyzes the sensor data 250 to distinguish surrounding vehicles from the surrounding environment (e.g., background, roadway, etc.). In various approaches, the acquisition module 220 employs different object recognition techniques to identify the surrounding vehicles. The particular technique employed to identify the surrounding vehicles may depend on available sensors within the vehicle 100, computational abilities (e.g., processor power) of the vehicle 100, and so on.

In one approach, the acquisition module 220 uses a machine learning algorithm embedded within the acquisition module 220, such as a convolutional neural network (CNN), to perform semantic segmentation over the sensor data 250 from which the surrounding vehicles are identified and extracted. Of course, in further aspects, the acquisition module 220 may employ different machine learning algorithms or implements different approaches for performing the semantic segmentation which can include deep convolutional encoder-decoder architectures, a multi-scale context aggregation approach using dilated convolutions, or another suitable approach that generates semantic labels for the separate object classes represented in the image. Whichever particular approach the acquisition module 220 implements, the acquisition module 220 provides an output with semantic labels identifying objects represented in the sensor data 250. In this way, the traffic system 170 distinguishes between objects and boundaries between the objects.

Additionally, the acquisition module 220 is generally capable of identifying the surrounding vehicles in order to acquire information about positions (e.g., lane of travel) and speeds of the surrounding vehicles from the sensor data 250. Thus, by way of example, the acquisition module 220, in one approach, initially acquires the sensor data 250, fuses the sensor data 250 from multiple sensors (i.e., registers and combines information), identifies the surrounding vehicles within the sensor data 250, and then determines relative positions and speeds associated with the surrounding vehicles according to, for example, measurements embodied within the sensor data 250.

The acquisition module 220 determines the measurements by, for example, analyzing the sensor data 250 for each of the surrounding vehicles relative to a center position of the reporting vehicle 100. That is, in one approach, the acquisition module 220 measures from a centroid of the vehicle 100 to the surrounding vehicle. Alternatively, the acquisition module 220 measures form a center point of a lane in which the reporting vehicle 100 is traveling, a forward edge center point of the reporting vehicle 100, a location of a controlling sensor, or another defined point of the reporting vehicle 100. In either case, the acquisition module 220 functions to translate the points together into a single reference point or generally use a single one of the noted points in order to maintain consistency between measurements.

A point on a surrounding vehicle that is being measured to by the reporting vehicle 100 can vary according to a particular implementation. In one approach, the acquisition module 220 measures to a centroid of a respective surrounding vehicle, which may be derived/assessed according to the identification of the surrounding vehicle. Alternatively, the acquisition module 220 may identify a closest point on the surrounding vehicle and determine a relative lateral center point related thereto to define a measurement point of the surrounding vehicle. In this way, the acquisition module 220 can adjust to varying detection positions (e.g., forward, adjacent, aft) of surrounding vehicles to provide a consistent measurement.

Additionally, in further aspects, the acquisition module 220 also processes the sensor data 250 to identify lanes within a roadway segment on which the vehicle 100 is traveling. For example, the acquisition module 220 may use similar techniques as employed to identify the surrounding vehicles. In further aspects, the acquisition module 220 uses high definition maps of a location to identify lane boundaries. In still further aspects, the acquisition module 220 uses a combination of maps and image recognition via onboard cameras to determine lane boundaries relative to the vehicle 100. In further aspects, the acquisition module 220, in one embodiment, uses existing lane identification functionality as may be provided for by integrated lane-keeping functions or autonomous driving functions to determine lane boundaries of a roadway segment. In either case, the acquisition module 220 may function to identify the lane boundaries relative to the vehicle 100 and as a manner of further placing the surrounding vehicles relative to the vehicle 100.

Furthermore, as previously indicated, the acquisition module 220 provides, in one embodiment, the derived information from the sensor data 250 for the identified surrounding vehicles as the traffic data 260. The traffic data 260, in one embodiment, includes quantities of distance and direction relative to the measurement point of the ego vehicle 100 for each separate surrounding vehicle. Thus, the measurements can be in the form of distance and direction, line quantities (e.g., two endpoints on a 2D plane, etc.), or in another suitable form. In one approach, the measurements are provided in a data structure that maintains a history of measurements associated with a unique surrounding vehicle. Thus, the acquisition module 220 provides an individual measurement as, for example, a data struct that stores a timestamp of the measurement, a unique identifier of the surrounding vehicle associated with the measurement.

In either case, the acquisition module 220 stores, for example, the measurements in a data structure together as, for example, a history of positions for each surrounding vehicle. Moreover, as previously indicated, the acquisition module 220 also stores a speed at the time of the measurement. Accordingly, the acquisition module 220 may track the surrounding vehicles in the history of measurements over a relative distance window from the vehicle 100. That is, for example, the acquisition module 220 can initially acquire a surrounding vehicle at a distance of 100 meters in front or behind the ego vehicle 100 and generally traveling in a same direction as the reporting vehicle 100. Thus, when the surrounding vehicle lapses from this tracking window, the measurements for the surrounding vehicle may be removed from the history, logged, or otherwise no longer considered in the context of tracking for identifying potential road hazards. It should be appreciated that while a tracking window of +/−100 m is noted, the particular tracking window implemented by the traffic system 170 may vary according to sensor fidelity, and/or other controlling factors.

While different approaches to identifying and locating surrounding vehicles may be undertaken, the acquisition module 220, for example, analyzes the sensor data 250 to generate observations of surrounding vehicles that are provided as the traffic data 260. As indicated, the traffic data 260 includes speeds/locations of the surrounding vehicles in relation to the reporting vehicle (e.g., vehicle 100). In further aspects, the traffic data 260 for the respective surrounding vehicles may be provided using absolute locations in the roadway segment, vehicle paths/tracks (e.g., positions over a period of time), as speeds for separate lanes along with precise location information, or in another suitable form.

In either case, the acquisition module 220 generally leverages computational resources of the vehicle 100 and associated sensors to identify the surrounding vehicles from the sensor data 250 (e.g., object recognition and localization), and provide refined observations in the form of identifications of the surrounding vehicles and associated locations as the traffic data 260. Furthermore, the sensor data 250 and the traffic data 260 derived therefrom also include information about the vehicle 100. That is, acquisition module 220 generally acquires locations of the vehicle 100 itself through GPS data, and/or locations derived through localizing on a feature-based map. As an additional aspect, the acquisition module 220 generates the traffic data 260 to include separate identifiers corresponding with different lanes, for the different vehicles. In one approach, the acquisition module 220 may use lane identifiers for the different lanes to also indicate a lane type (e.g., HOV lane, exit, lane, turn lane, etc.).

Of course, in one embodiment, the aggregated traffic data 260 is stored within a cloud-based computing system (e.g., environment 300) as received from the separate vehicles which include separate instances of the acquisition module 220. In further embodiments, the database 240 and/or the memory 210 store a speed model 270 which is a statistical or learning model that characterizes locations/speeds of surrounding vehicles to generate determinations of traffic for a roadway segment (e.g., congestion). In various approaches, the speed model 270 can take different forms depending on various aspects relating to the implementation.

In one embodiment, the flow module 230 generally includes instructions that function to control the processor 110 or collection of processors in the cloud-computing environment 300 to analyze the traffic data 260. In one approach, the flow module 230 analyzes the traffic data 260 using the speed model 270. It should be appreciated that the flow module 230 in combination with the speed model 270 can form a computational model such as a machine learning logic, deep learning logic, a neural network model, or another suitable approach. In one embodiment, the speed model 270 is a statistical model such as a regression model that estimates the traffic flow for respective lanes according to observations embodied in the traffic data 260. Accordingly, the speed model 270 can be a polynomial regression (e.g., least weighted polynomial regression), least squares or another suitable approach.

Moreover, in alternative arrangements, the speed model 270 is a probabilistic approach such as a hidden Markov model. In either case, the flow module 230, when implemented as a neural network model or another model, in one embodiment, electronically accepts the aggregated traffic data 260 as an input. Accordingly, the flow module 230 in concert with the model 270 produce various determinations/assessments (e.g., identified flow patterns correlating with particular congestion) as an electronic output that characterizes the noted aspect as, for example, a single electronic value. Moreover, in further aspects, the traffic system 170 can collect the noted data, log responses, and use the data and responses to subsequently further train the model 270.

As an additional note, it should be appreciated that the flow module 230 and the model 270 while discussed as being implemented within the cloud-computing environment 300 or, more generally, separate from the vehicle 100 may be implemented within the vehicle 100 in one or more approaches. In such a configuration, the acquisition module 220 may aggregate the traffic data 260 using, for example, vehicle-to-vehicle (V2V) communications or another suitable approach.

In any case, the flow module 230 is generally configured to generate one or more electronic signals identifying traffic flow (e.g., average speeds of respective lanes in a roadway segment) and, in one approach, flow patterns indicating trends in the traffic data 260. In one embodiment, the flow module 230 generates the flow data for individual segments of a roadway and according to separate lanes of a segment. Thus, in one approach, the flow data specifies average speeds for a set of lanes within a segment. In further aspects, the flow data indicates variations in average speeds for the lanes over the segment. Accordingly, depending on a length of the segment, the flow module 230 may generate a single value for a respective lane or values that characterize subsections of the lanes. The subsections may be of a predefined length (e.g., 500 yards, 1000 yards, etc.). Moreover, the segments themselves are defined, in one embodiment, according to logical divisions of roadways (e.g., lengths between blocks, between highway exits, etc.), according to logical divisions and maximum segment lengths (e.g., 1 mile), or according to another suitable approach. It should be appreciated, that the definitions of segments can vary according to implementation and thus the noted approaches are provided for purposes of explanation.

Moreover, as briefly indicated, the traffic flow can also specify flow patterns. The flow patterns indicate observed trends as identified by the flow module 230 and the speed model 270 within the traffic data 260. The trends can be particular to respective lanes and or in relation to an overall segment. For example, in one approach, the flow patterns for a segment indicate whether each respective lane is increasing in congestion, maintaining current congestion, or decreasing in congestion. In further aspects, the flow pattern identifies likely sources of congestion such as exit lanes, on-ramps, turns, intersections, hazards, and so on.

In either case, the flow module 230, in response to the electronic signal identifying the traffic flow, provides the traffic flow to devices/services associated with the roadway segment. In one embodiment, the flow module 230 queries a vehicle location service to identify vehicles that are approaching the roadway segment. For example, an OEM or another provider may track vehicles in order to maintain awareness of locations of the vehicles for various services. Accordingly, the flow module 230 identifies which vehicles are approaching the roadway segment via the location service and communicates the electronic signal to the relevant vehicles. In one embodiment, the flow module 230 uses the electronic signal conveyed to the oncoming vehicles as a mechanism to warn the oncoming vehicles about the presence of traffic congestion. Thus, the traffic flow communicated to an oncoming vehicle may cause the oncoming vehicle to travel in a less congested lane, to reroute a travel plan, or take other measures in relation to the identified traffic flow.

In further aspects, the flow module 230 publishes the traffic flow to a web service, a cloud-based service or another Internet-connected source that is accessible to various devices. Thus, the traffic flow can also be used by third-party sources to monitor congestion and perform other activities (e.g., route planning) when not in route through the roadway segment.

Figure 4:
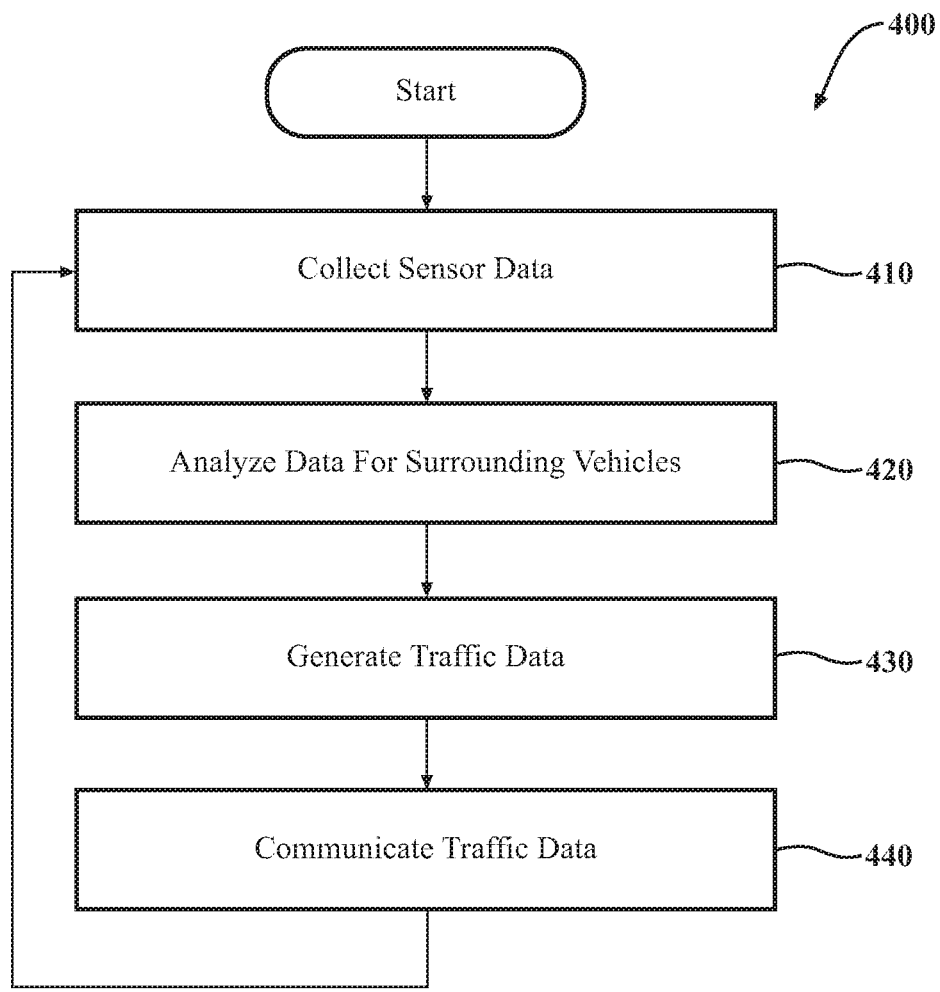
FIG. 4 illustrates one embodiment of a method that is associated with observing and reporting traffic about surrounding vehicles.

Additional aspects of identifying traffic flow over roadway segments will be discussed in relation to FIG. 4. FIG. 4 illustrates a flowchart of a method 400 that is associated with collecting traffic data about surrounding vehicles of a reporting vehicle. Method 400 will be discussed from the perspective of the traffic system 170 of FIGS. 1, 2, and 3. While method 400 is discussed in combination with the traffic system 170, it should be appreciated that the method 400 is not limited to being implemented within the traffic system 170 but is instead one example of a system that may implement the method 400. Moreover, the functionality discussed in relation to FIG. 4 and method 400 is generally implemented by respective reporting vehicles such as vehicle 100 traveling along a roadway.

At 410, the acquisition module 220 controls the sensor system 120 to acquire the sensor data 250. In one embodiment, the acquisition module 220 controls the radar sensor 123 and the camera 126 of the vehicle 100 to observe the surrounding environment. Alternatively, or additionally, the acquisition module 220 controls the camera 126 and the LiDAR 124 or another set of sensors to acquire the sensor data 250. As part of controlling the sensors to acquire the sensor data 250, it is generally understood that the sensors acquire the sensor data 250 of a region around the ego vehicle 100 with data acquired from different types of sensors generally overlapping in order to provide for a comprehensive sampling of the surrounding environment at each time step. Thus, the acquisition module 220, in one embodiment, controls the sensors to acquire the sensor data 250 of the surrounding environment.

Moreover, in further embodiments, the acquisition module 220 controls the sensors to acquire the sensor data 250 at successive iterations or time steps. Thus, the acquisition module 220, in one embodiment, iteratively executes the functions discussed at blocks 410-440 to acquire the sensor data 250 and provide information therefrom. Furthermore, the acquisition module 220, in one embodiment, executes one or more of the noted functions (e.g., 410 and 420) in parallel for separate observations in order to maintain updated perceptions. Additionally, as previously noted, the acquisition module 220, when acquiring data from multiple sensors, fuses the data together to form the sensor data 250 and to provide for improved determinations of detection, location, speed, and so on.

At 420, the acquisition module 220 analyzes the sensor data 250 to identify the surrounding vehicles including relative locations of the surrounding vehicles. In one embodiment, the acquisition module 220 within the vehicle 100 processes the sensor data 250 in order to detect surrounding vehicles traveling on the roadway segment with the reporting vehicle 100. In one embodiment, the acquisition module 220 applies, as previously noted, semantic segmentation or another object recognition approach to the sensor data 250 in order to detect/identify the surrounding vehicle(s). It should be appreciated that the systems and methods disclosed herein perform the noted tasks to detect a single or multiple surrounding vehicles depending on current conditions.

Of course, the acquisition module 220 may also identify further features in addition to the surrounding vehicles such as the sky, roads, buildings, lane markings, curbs, sidewalks, signs, posts, trees, and so on. In this way, the traffic system 170 delineates between aspects of the surrounding environment to extract the surrounding vehicles. Moreover, the acquisition module 220, in one approach, further employs one or more additional sources such as other vehicles, infrastructure sensors, high-definition maps, and so on to delineate different aspects (e.g., lane markings) of the surrounding environment. As an additional aspect, the acquisition module 220 tracks a current speed of the vehicle 100 in order to translate relative speeds of the surrounding vehicles into absolute speeds. Thus, the sensor data 250 generally includes positions, speeds, lane identifiers, and other relevant information about each surrounding vehicle in addition to location and speed information about the vehicle 100 itself.

At 430, the acquisition module 220 generates the traffic data 260. In one embodiment, the acquisition module 220 generates the traffic data 260 as a relative position and speed of each separate surrounding vehicle in relation to the reporting vehicle 100. The relative position is determined, in one approach, from a center point of the lane in which the reporting vehicle 100 is traveling and from a longitudinal location in the lane of the reporting vehicle 100. In further aspects, the relative position is determined from a centroid of the reporting vehicle 100 or another suitable location. In any case, the acquisition module 220 generally determines the relative position as a measurement to a lateral geometric center of the surrounding vehicle. Thus, the relative position is generally defined according to a position in a two-dimensional coordinate system with the reporting vehicle 100 located at a center thereof. As such, the acquisition module 220 can provide the traffic data as a set of relative locations for the surrounding vehicles in relation to an absolute measurement (e.g., GPS coordinates) for the reporting vehicle 100. In alternative approaches, the acquisition module 220 generates the traffic data 260 from the sensor data 250 to include absolute locations for both the surrounding vehicles and the reporting vehicle 100. Additionally, the traffic data 260 identifies speeds, changes in speeds, and other dynamic information about the surrounding vehicles and the vehicle 100. In either case, the acquisition module 220 produces the traffic data 260 as a reporting about the vehicle 100 and the surrounding vehicles in order to facilitate knowledge of current traffic flow/congestion within the roadway segment.

Additionally, the acquisition module 220 generally identifies the separate surrounding vehicles according to full observations and, in one approach, partial observations. That is, where a vehicle may be partially occluded because of another vehicle (e.g., large vehicle/truck), the acquisition module 220 may still identify the occluded surrounding vehicle so long as the sensor data 250 includes a sufficient observation from which location and speed of the occluded vehicle can be derived. Thus, when traveling in, for example, heavy traffic, the acquisition module 220 can still provide the traffic data about a plurality of surrounding vehicles to effectively multiply the observations of the roadway segment.

Moreover, the acquisition module 220 maintains the traffic data 260, in one embodiment, as a vehicle track/path for the surrounding vehicles and the reporting vehicle 100. In one embodiment, the acquisition module 220 appends successive observations together for each vehicle to generate a history of observations that form a path the respective vehicle has traveled along the roadway segment. The acquisition module 220 may associate a unique identifier with the separate vehicles that facilitate tracking the vehicles between observations. As one example, each successive entry of a vehicle may specify a lane, a general location, a currently observed speed, and so on. In this way, the acquisition module 220 accumulates information about the surrounding vehicles. Thus, as indicated, the history of observations for the vehicles are updated, and, for example, intermittently reported.

At 440, the acquisition module 220 communicates an electronic data structure that includes the traffic data 260 to a remote device. In one embodiment, the acquisition module 220 electronically transmits the data structure to a separate iteration of the acquisition module 220 implemented in a separate device (e.g., cloud-computing device). As previously discussed, at least a portion of the acquisition module 220 may be situated in a remote location such as within a cloud-computing environment, distributed computing environment, remote server, or another suitable configuration.

In either case, the reporting vehicle 100 functions to provide the traffic data 260 about the locations of the vehicles in order to communicate real-time or near real-time information about traffic patterns within a roadway segment. As such, as multiple reporting vehicles travel over the same roadway segment, a comprehensive understanding of the lanes and congestion within the respective lanes can be developed with the use of only a subset of vehicles that are traveling over the roadway segment. That is, even though the reporting vehicles that are providing information about the roadway segment may represent a relatively small percentage of vehicles actually traversing the roadway segment, because the reporting vehicles track surrounding vehicles in addition to their own locations the aggregated traffic data 260 can represent a majority of vehicles actually traversing the roadway segment. Thus, the reporting vehicles collectively function to provide a comprehensive sampling of the traffic on the roadway segment, and thus thereby improve the ability to subsequently identify traffic flow.

Figure 5:
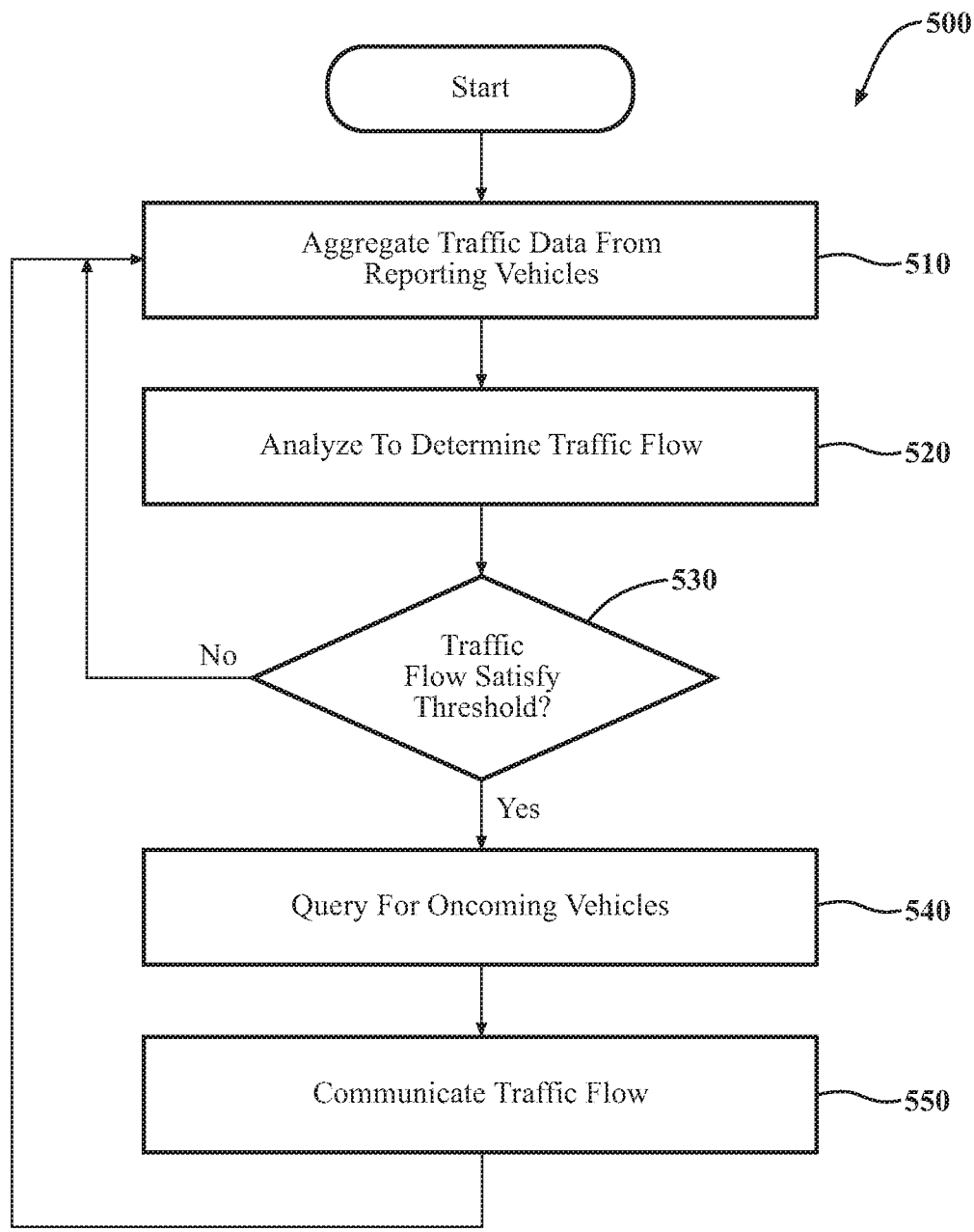
FIG. 5 illustrates one embodiment of a method that is associated with aggregating observations from a plurality of reporting vehicles to determine traffic flow.

As a further explanation of how the traffic system 170 improves determinations of traffic flow on a roadway, consider FIG. 5. Method 500 will be discussed from the perspective of the traffic system 170 of FIGS. 1, 2, and 3. While method 500 is discussed in combination with the traffic system 170, it should be appreciated that the method 500 is not limited to being implemented within the traffic system 170 but is instead one example of a system that may implement the method 500.

At 510, the acquisition module 220 collects the traffic data 260. In one embodiment, the acquisition module 220 aggregates the traffic data 260 from a plurality of reporting vehicles. Of course, because the reporting vehicles are generally located at different locations across a geographic area, the acquisition module 220, in one embodiment, filters incoming communications into respective electronic data stores (e.g., electronic storage buckets) according to a roadway segment associated therewith. Thus, separate determinations about a respective roadway segment are executed over traffic data 260 of an individual associated bucket. Thus, however many reporting vehicles travel over a given roadway segment and contribute to the traffic data 260 of a given bucket is what the flow module 230 uses to perform the noted functions.

For purposes of the present discussion, the communications and associated traffic data 260 acquired therefrom are considered to relate to a single roadway segment. Thus, the acquisition module 220 acquires the traffic data 260 for a particular roadway segment. In general, the roadway segment may be defined according to a predefined length, a logical division, or another suitable metric. In any case, the roadway segment is generally defined as a section of roadway including lanes of a particular travel direction. Thus, a south-bound and a north-bound section of the same highway may be defined as separate roadway segments for purposes of this disclosure.

In either case, the acquisition module 220 acquires the traffic data 260 for the roadway segment in order to, for example, accumulate a sufficient sample of vehicles passing over the roadway segment to capture a representation of traffic along the roadway segment. Moreover, the acquisition module 220, in one embodiment, aggregates the traffic data 260 for a defined period of time before, for example, shifting at least a portion the traffic data 260 (e.g., an oldest portion of the traffic data 260) into an archive.

Thus, the acquisition module 220 can treat separate portions of the traffic data 260 as having a viable lifetime within which the information included therein is considered to be accurate or representative of a current condition on the roadway segment. The viable lifetime for the traffic data 260 may vary according to a particular implementation and may fluctuate according to various metrics such as time of day, previously measured traffic flow, throughput of the particular roadway segment, presence of identified obstructions/hazards, weather conditions, and so on. In either case, the acquisition module 220 stores the traffic data 260 in an electronic data store to maintain a representation of traffic flow on the roadway segment.

At 520, the flow module 230 analyzes the traffic data 260 to determine the traffic flow over the segment for respective lanes. As previously discussed, the traffic flow can be generated with varying degrees specificity and determinations. However, the flow module 230 in combination with the speed model 270 generally produces the traffic flow to indicate at least an average speed for each lane over a roadway segment. Thus, the traffic flow indicates a flow of traffic within each lane of the roadway segment as opposed to the roadway segment overall. In further aspects, the flow module 230 indicates average speeds on a per-lane basis within subsections of the roadway segment that are defined according to the particular implementation. By way of example, the subsections may be 1000 yards, 1500 yards, etc. Moreover, the flow module 230 produces the flow patterns, as previously discussed, that are indicative of traffic trends within the roadway segment.

In either case, the flow module 230 produces the noted values using the speed model 270. The speed model 270 is a machine learning model, a statistical model, or some other characterization of traffic that computes the average speeds and, in one approach, identifies patterns matching those that occur in correlation with particular flows of the traffic. Thus, in various approaches, the model 270 is trained to identify when a flow pattern embodied in the traffic data 260 is present. As such, the flow module 230 identifies average speeds over individual lanes and also patterns in the average speeds correlating with known flow patterns. Thus, the flow module 230 can provide the flow patterns as a manner of further understanding the congestion and likely future states of the congestion.

At 530, the flow module 230 determines whether the traffic flow is sufficient to provide alerts to oncoming vehicles. In various implementations, the method 500 may skip block 530 and simply proceed with reporting the traffic flow at 540 and 550. That is, the flow module 230 may report the traffic flow without regard to whether a threshold is satisfied.

However, in one embodiment, the flow module 230 further analyzes the traffic flow to determine whether the average speed in the lanes of the roadway segment satisfies a flow threshold. The flow threshold is, in one embodiment, a minimum speed at which one or more lanes may be flowing to be considered, for example, adequately flowing for traffic to pass unencumbered. Thus, the flow threshold, in one embodiment, is defined as a percent of the speed limit for the roadway segment. In further aspects, the flow threshold is defined according to throughput of a traffic lane or another suitable metric.

In either case, if the flow module 230 determines that the traffic flow is sufficient, then the flow module 230 does not progress to generate a warning or other signal that is provided to oncoming vehicles and may, in one embodiment, instead simply log or report the traffic flow to a web service, cloud-service, or other accessible system that can provide the traffic flow upon request. However, if the traffic flow is determined to be indicative of congestion and thus satisfies the flow threshold, then the flow module 230 proceeds with steps to inform oncoming vehicles.

At 540, the flow module 230 queries a location service to identify oncoming vehicles that are approaching the road segment. In one embodiment, as previously noted, the flow module 230 queries an OEM tracking service or another service that is aware of locations of vehicles respective to the roadway segment. In further aspects, the flow module 230 may query for available secondary alert services such as dynamic traffic boards or other mechanisms for providing information to oncoming vehicles. In any case, the location service and/or alert service provide information relating to the presence of vehicles and/or other warning mechanisms. In general, the flow module 230 acquires network addresses or other communication addresses/identifiers (e.g., IP address, phone number, etc.) in order to direct the information about the traffic flow to the oncoming vehicles. In further aspects, the flow module 230 includes pre-programmed services to which the traffic flow is to be reported. That is, the flow module 230 may be in communication with a web-based service that provides a relate for reporting the traffic flow such that the traffic flow can be integrated with various navigation systems, map systems, and other associated reporting mechanisms.

At 550, the flow module 230 provides an electronic signal communicating the traffic flow. In one embodiment, the flow module 230 provides the electronic signal identifying the traffic flow as a broadcast/multicast to the oncoming vehicles of the roadway segment. That is, the flow module 230 communicates the signal as an alert about the traffic flow to the oncoming vehicles, to a dynamic highway sign along a route before the roadway segment, and/or to another specified device (e.g., mobile phone) and/or service as indicated in order to convey information about the traffic flow. In this way, the traffic system 170 aggregates the traffic data 260 about a multiplicity of vehicles traveling over a road segment using a network of reporting vehicles and provides traffic conditions therefrom to improve how subsequent oncoming vehicles navigate the road segment.

Figure 6:
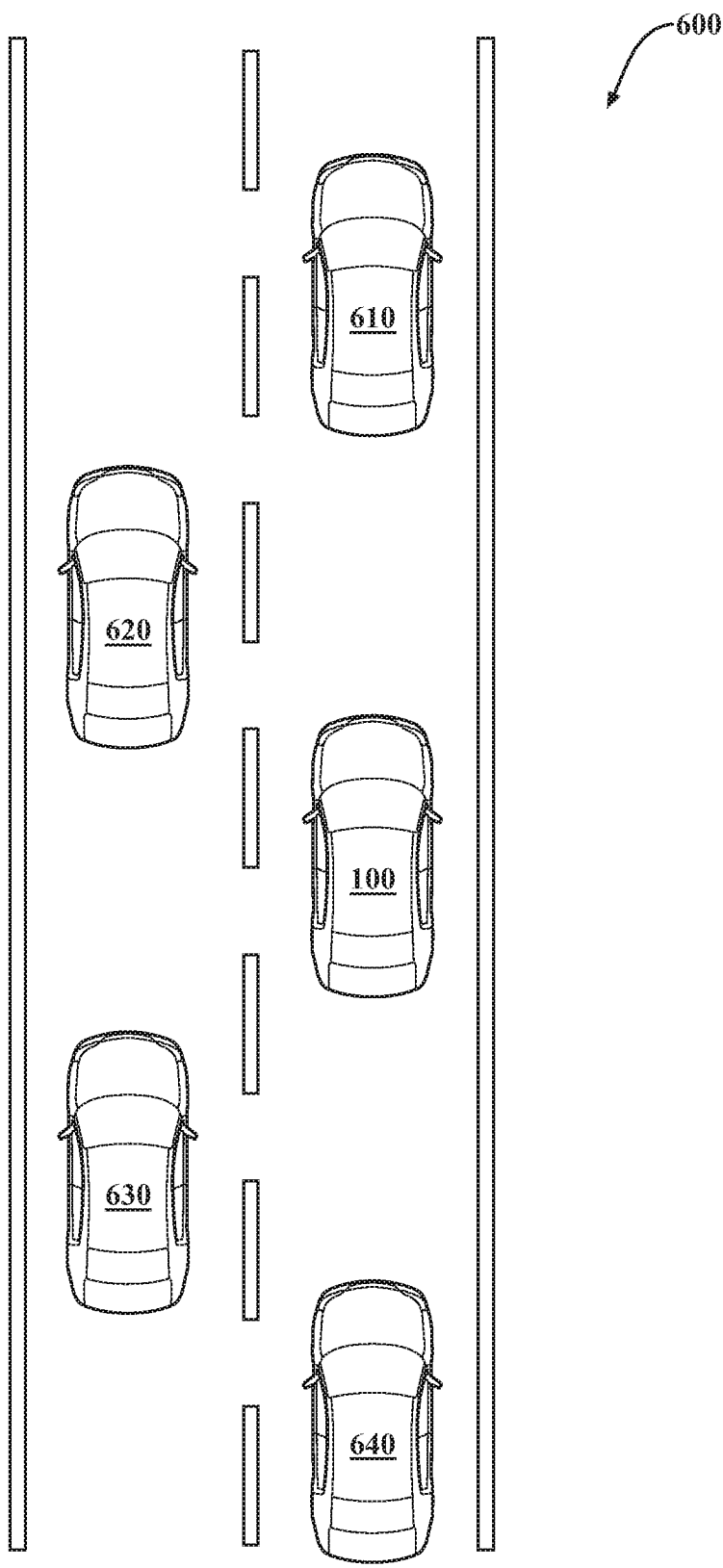
FIG. 6 illustrates one example of a configuration of vehicles on a roadway segment.
Figure 7:
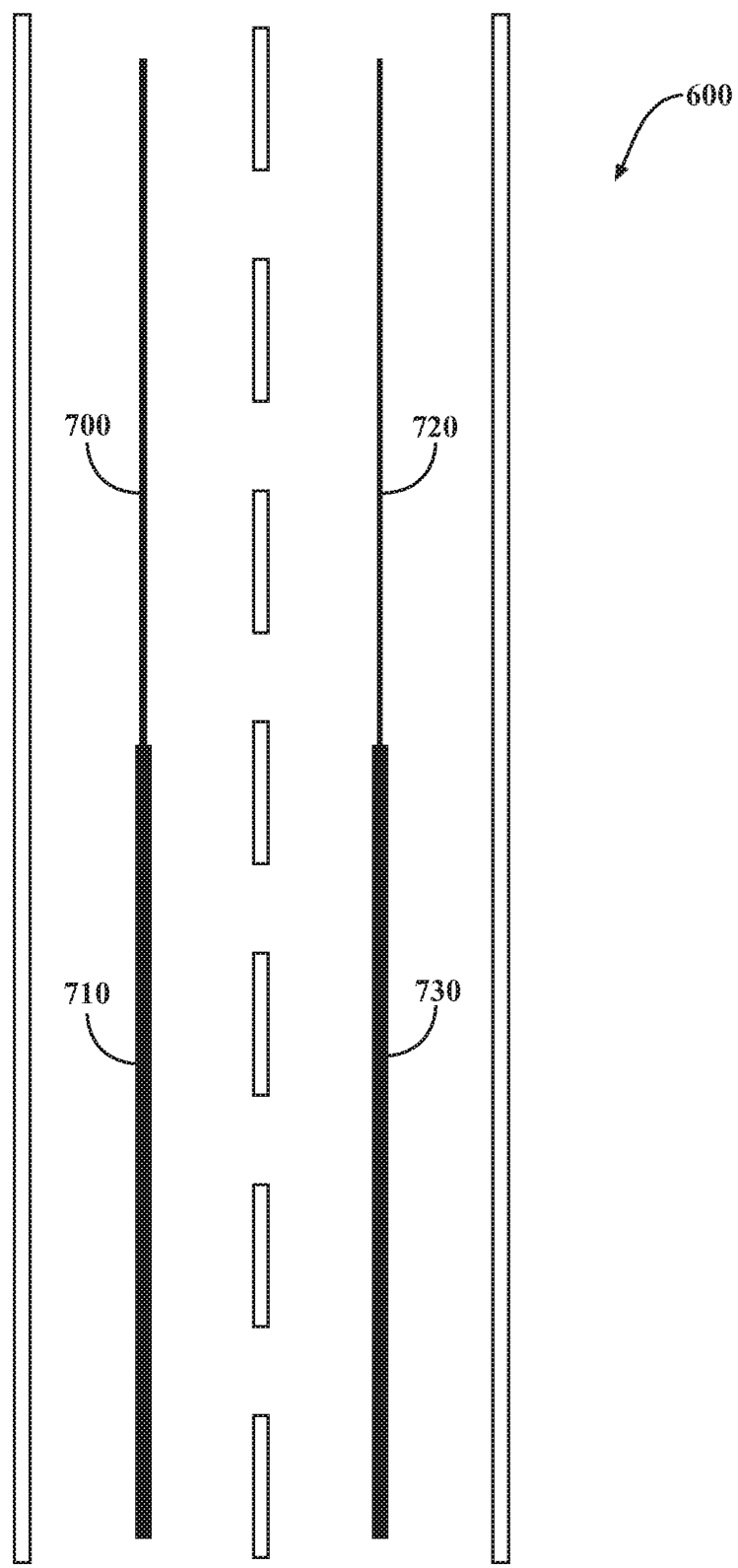
FIG. 7 illustrates an example traffic flow over the roadway segment of FIG. 6.

As a further explanation of how the traffic system 170 identifies and communicates about traffic flow consider FIGS. 6-7. FIG. 6 illustrates an example of a roadway segment 600. The roadway segment 600 is illustrated as including the reporting vehicle 100, surrounding vehicles 610, 620, 630, and 640. Thus, from the perspective of the reporting vehicle 100, the surrounding vehicles 610, 620, 630, and 640 are generally directly perceived by sensors of the vehicle 100 but the surrounding vehicles may also include vehicles that are partially obstructed by other vehicles even though not illustrated. Thus, as the vehicle 100 is progressing along the roadway segment 600, the acquisition module 220 acquires the sensor data 250 about the vehicles 610, 620, 630, 640 and develops the sensor data into traffic data 260 that effectively tracks speeds, locations, and lanes associated with the vehicles 610, 620, 630, and 640.

FIG. 7 illustrates a traffic flow for aggregated traffic data 260 as collected about, for example, the surrounding vehicles 610, 620, 630, 640 and other such vehicles over the roadway segment 600. The traffic flow illustrates separate flows for individual lanes and also subsections longitudinally along the lanes. For example, the subsections include 700, 710, 720, and 730. The thickness of the associated lanes generally correlates with the average speed on the noted subsection of the respective lane. Thus, the sections 710 and 730 are associated with no congestion or an average speed that is at or above a speed limit, while sections 700 and 720 illustrate thinner lines that are associated with successively reduced traffic flow (i.e., lower average speeds in relation to a speed limit). As an additional outcome, the flow module 230 can also indicate that the traffic flow for the roadway segment in FIG. 7 is indicative of, for example, increasing congestion because of the reduced speed in section 720 in relation to the other sections that correlates with a hazard on the roadway that is influencing the traffic flow. In this way, the traffic system 170 improves awareness about traffic flow thereby improving overall navigation and avoiding of such issues.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the traffic system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the traffic system 170, and/or the autonomous driving module(s) 160 may control some or all of these vehicle systems 140 and, thus, may be partially or fully autonomous.

The processor(s) 110, the traffic system 170, and/or the autonomous driving module(s) 160 can be operatively connected to communicate with the various vehicle systems 140 and/or individual components thereof. For example, returning to FIG. 1, the processor(s) 110, the traffic system 170, and/or the autonomous driving module(s) 160 can be in communication to send and/or receive information from the various vehicle systems 140 to control the movement, speed, maneuvering, heading, direction, etc. of the vehicle 100. The processor(s) 110, the traffic system 170, and/or the autonomous driving module(s) 160 may control some or all of these vehicle systems 140.

The processor(s) 110, the traffic system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the traffic system 170, and/or the autonomous driving module(s) 160 can control the direction and/or speed of the vehicle 100. The processor(s) 110, the traffic system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the traffic system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the traffic data 260 as implemented by the flow module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A traffic system for determining traffic flow along a roadway segment, comprising:
   one or more processors;
   a memory communicably coupled to the one or more processors and storing:
   an acquisition module including instructions that when executed by the one or more processors cause the one or more processors to collect, in an electronic data store from reporting vehicles that travel over the roadway segment, traffic data about at least surrounding vehicles of the reporting vehicles, wherein the surrounding vehicles are separate vehicles from the reporting vehicles that the reporting vehicles observe; and
   a flow module including instructions that when executed by the one or more processors cause the one or more processors to analyze the traffic data to identify a traffic flow for respective lanes of the roadway segment, and
   wherein the flow module includes instructions to provide a signal identifying the traffic flow by electronically communicating a message to oncoming vehicles approaching the roadway segment to inform the oncoming vehicles about the traffic flow and to cause the oncoming vehicles to adjust operation according to the traffic flow.

2. The traffic system of claim 1, wherein the traffic data includes lane identifiers that indicate lanes of travel in the roadway segment for respective ones of the surrounding vehicles and observed speeds of the surrounding vehicles.

3. The traffic system of claim 1, wherein the acquisition module includes instructions to collect the traffic data including instructions to aggregate the traffic data in the electronic data store as the reporting vehicles travel over the roadway segment and communicate the traffic data to a remote device that includes the electronic data store, and
   wherein the traffic data indicates variations in speeds for the surrounding vehicles as the surrounding vehicles travel along the roadway segment.

4. The traffic system of claim 1, wherein the flow module includes instructions to analyze the traffic data including instructions to apply a speed model over the traffic data to identify the traffic flow separately for the respective lanes of the roadway segment by determining speed patterns in successively observed vehicles traveling in the respective lanes of the roadway segment, and
   wherein the flow module includes instructions to provide the signal including instructions to indicate the traffic flow as current speeds of the respective lanes.

5. The traffic system of claim 4, wherein the flow module includes instructions to analyze the traffic data to identify the traffic flow including instructions to generate a flow pattern for the traffic data that indicates trends in the traffic flow across lanes of the roadway segment, and
   wherein the flow pattern indicates a likelihood that congestion on the roadway segment is clearing, increasing, or maintaining current levels.

6. The traffic system of claim 1, wherein the flow module includes instructions to provide the traffic flow including instructions to communicate the traffic flow to devices associated with the roadway segment as average speeds for the respective lanes, and
   wherein the devices associated the roadway segment include at least oncoming vehicles that are approaching the roadway segment.

7. The traffic system of claim 1, wherein the acquisition module includes instructions to collect the traffic data including instructions to:
   acquire, in respective ones of the reporting vehicles, sensor data from at least one sensor of respective ones of the reporting vehicles;
   analyze, in the respective ones of the reporting vehicles, the sensor data to identify the surrounding vehicles including relative speeds and lanes of the surrounding vehicles; and communicate, from the respective ones of the reporting vehicles, an electronic data structure that includes the relative speeds and the lanes to a remote device.

8. The traffic system of claim 1, wherein the acquisition module and the flow module are embodied, at least in part, within a cloud-computing system.

9. A non-transitory computer-readable medium for determining traffic flow along a roadway segment and including instructions that when executed by one or more processors cause the one or more processors to:
   collect, in an electronic data store from reporting vehicles that travel over the roadway segment, traffic data about at least surrounding vehicles of the reporting vehicles, wherein the surrounding vehicles are separate vehicles from the reporting vehicles that the reporting vehicles observe;
   analyze the traffic data to identify a traffic flow for respective lanes of the roadway segment; and
   provide a signal identifying the traffic flow by electronically communicating a message to oncoming vehicles approaching the roadway segment to inform the oncoming vehicles about the traffic flow and to cause the oncoming vehicles to adjust operation according to the traffic flow.

10. The non-transitory computer-readable medium of claim 9, wherein the traffic data includes lane identifiers that indicate lanes of travel in the roadway segment for respective ones of the surrounding vehicles and observed speeds of the surrounding vehicles.

11. The non-transitory computer-readable medium of claim 9, wherein the instructions to provide the traffic flow include instructions to communicate the traffic flow to devices associated with the roadway segment as average speeds for the respective lanes, and
   wherein the devices associated the roadway segment include at least oncoming vehicles that are approaching the roadway segment.

12. The non-transitory computer-readable medium of claim 9, wherein the instructions to collect the traffic data including instructions to aggregate the traffic data in the electronic data store as the reporting vehicles travel over the roadway segment and communicate the traffic data to a remote device that includes the electronic data store, and
   wherein the traffic data indicates variations in speeds for the surrounding vehicles as the surrounding vehicles travel along the roadway segment.

13. The non-transitory computer-readable medium of claim 9, wherein the instructions to analyze the traffic data include instructions to apply a speed model over the traffic data to identify the traffic flow separately for the respective lanes of the roadway segment by determining speed patterns in successively observed vehicles traveling in the respective lanes of the roadway segment, and
   wherein the instructions to provide the signal include instructions to indicate the traffic flow as current speeds of the respective lanes.

14. A method for determining traffic flow along a roadway segment, the method comprising:
   collecting, in an electronic data store from reporting vehicles that travel over the roadway segment, traffic data about at least surrounding vehicles of the reporting vehicles, wherein the surrounding vehicles are separate vehicles from the reporting vehicles that the reporting vehicles observe;
   analyzing the traffic data to identify a traffic flow for respective lanes of the roadway segment; and
   providing a signal identifying the traffic flow by electronically communicating a message to oncoming vehicles approaching the roadway segment to inform the oncoming vehicles about the traffic flow and to cause the oncoming vehicles to adjust operation according to the traffic flow.

15. The method of claim 14, wherein the traffic data includes lane identifiers that indicate lanes of travel in the roadway segment for respective ones of the surrounding vehicles and observed speeds of the surrounding vehicles.

16. The method of claim 14, wherein collecting the traffic data includes aggregating the traffic data in the electronic data store as the reporting vehicles travel over the roadway segment and communicate the traffic data to a remote device that includes the electronic data store, and
   wherein the traffic data indicates variations in speeds for the surrounding vehicles as the surrounding vehicles travel along the roadway segment.

17. The method of claim 14, wherein analyzing the traffic data includes applying a speed model over the traffic data to identify the traffic flow separately for the respective lanes of the roadway segment by determining speed patterns in successively observed vehicles traveling in the respective lanes of the roadway segment, and
   wherein providing the signal includes indicating the traffic flow as current speeds of the respective lanes.

18. The method of claim 17, wherein analyzing the traffic data to identify the traffic flow includes generating a flow pattern for the traffic data that indicates trends in the traffic flow across lanes of the roadway segment, and
   wherein the flow pattern indicates a likelihood that congestion on the roadway segment is clearing, increasing, or maintaining current levels.

19. The method of claim 14, wherein providing the traffic flow includes communicating the traffic flow to devices associated with the roadway segment as average speeds for the respective lanes, and wherein the devices associated the roadway segment include at least oncoming vehicles that are approaching the roadway segment.

20. The method of claim 14, wherein collecting the traffic data includes:
   acquiring, in respective ones of the reporting vehicles, sensor data from at least one sensor of respective ones of the reporting vehicles;
   analyzing, in the respective ones of the reporting vehicles, the sensor data to identify the surrounding vehicles including relative speeds and lanes of the surrounding vehicles; and
   communicating, from the respective ones of the reporting vehicles, an electronic data structure that includes the relative speeds and the lanes to a remote device.

* * * * *